*T. Carpenter.*
*Clover Huller.*
Nº 10,667.    Patented Mar. 21, 1854.
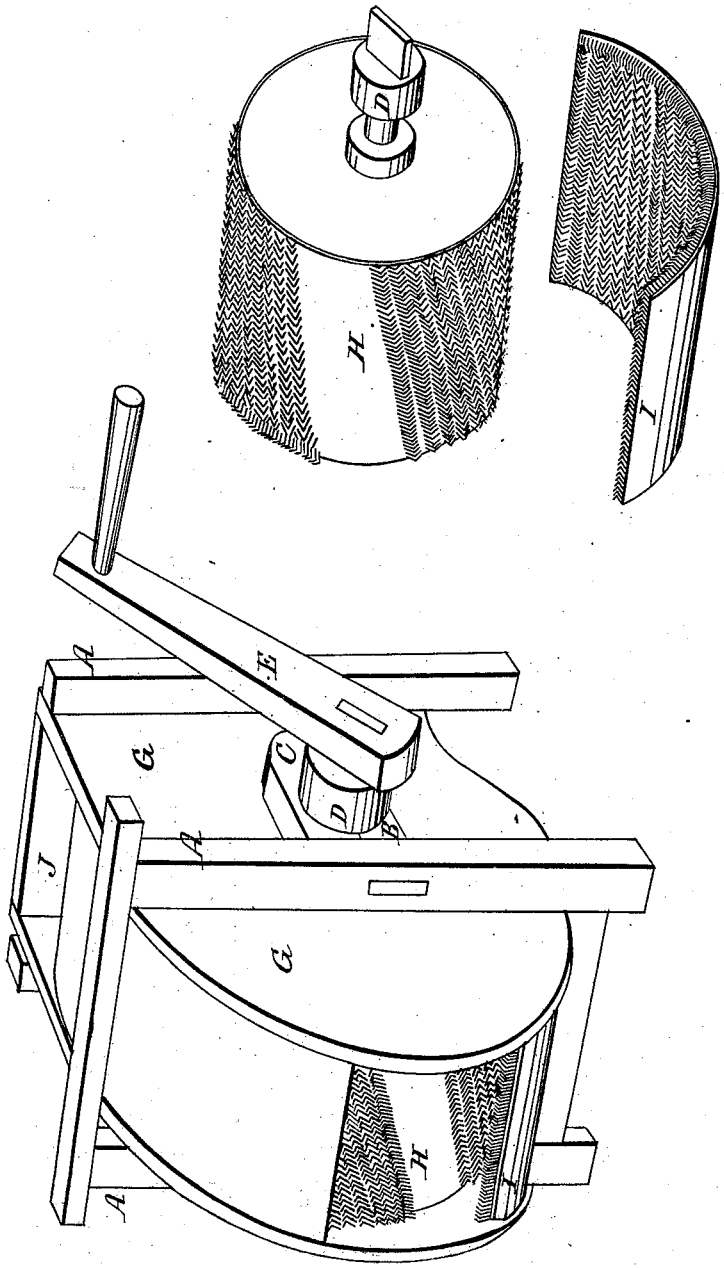

UNITED STATES PATENT OFFICE.

THOS. CARPENTER, OF MANLIUS, NEW YORK.

CONCAVE CLOVER-HULLER.

Specification of Letters Patent No. 10,667, dated March 21, 1854.

*To all whom it may concern:*

Be it known that I, THOMAS CARPENTER, of the village of Manlius, in the county of Onondaga and State of New York, have invented a new and useful Improvement in Devices for Threshing and Cleaning Clover-Seed; and I do hereby declare the following to be a full, clear, and exact description of the same, reference being had to the annexed drawings, making part of this specification.

The nature of my invention consists in substituting cards, such as are used in carding wool, &c., in place of teeth and other devices in common use for the same purpose, and which latter are objectionable in breaking the seed.

To enable others skilled in the art to make and use my invention, I will proceed to describe its construction and operation.

Make a frame (A) of hard wood, say about three feet in height, and of the same length and breadth, having cross bars (B) upon two opposite sides. Attach a box (C) to each of the bars (B) for the purpose of holding the journals of the shaft (D). Make the shaft (D) of wood or iron as may be preferred, having a pulley or band wheel upon one end, and a crank (E) upon the other. The crank to be used when cleaning by hand, and the pulley when the machine is to be worked by horse or other power. Make the box or case (G) of thin boards, in shape similar to that shown in the drawing, and of such dimensions as to be contained within the frame (A). Let the box (G) be made in two parts or halves, the lower being made fast to the frame, and the upper removable at pleasure in order to remove the cylinder whenever it becomes necessary. Make a cylinder (H) of wood say about two feet in diameter, which attach firmly to the shaft (D), its length being the same as the width of the case (G).

Cover the surface of the cylinder (H) with leather set with wire teeth in the manner of cards used in wool carding. The whole surface of the cylinder may be covered, or sections only as may be thought best. Make the lower part (I) of the case (G) concave upon its upper surface so as to correspond with the convex surface of the cylinder, and cover the concave surface with card of the same kind as is placed upon the cylinder. Put the seed (while it is with the chaff) into the opening (J) in the top of the machine, and by turning the crank the cylinder will revolve carrying the chaff between the convex and concave cards, and the two cards working in contact rub off the hulls from the seed. The wires of the cards being attached to leather yield in such a manner as not to endanger breaking or injuring the seed. Other machines now in use do not perfectly clear the seed from the hulls.

By the use of cards as in this machine all of the seed is cleared from the hulls, and much can be saved that would otherwise be lost in the chaff. When desired, a blowing machine may be attached so as to fan the seed at the same time of its being threshed.

The sole novelty or advantage of my invention consists in making or setting the wires or teeth upon the cylinder and concave in such a manner that they will yield when the seed passes between them, whereas if they were fixed the seed would be crushed.

What I claim as my invention, and desire to secure by Letters Patent, is—

The manner herein set forth of threshing or clearing the hull from the berry of clover seed, viz., by passing the seed between two cards as described, one of the cards being attached to the surface of a cylinder, and the other attached to a concave surface, so that the wires of the cards are in contact; the cylinder being revolved, while the concave is stationary, the hulls are rubbed off without danger of cracking the seed; the whole constructed substantially as described.

THOMAS CARPENTER.

Witnesses:
A. F. NOBLE,
R. F. STEVENS.